United States Patent Office 3,397,947
Patented Aug. 20, 1968

3,397,947
STABILIZED POLYPHOSPHATE PRODUCTS
Kenneth J. Shaver, St. Louis, Mo., assignor to Monsanto Company, St. Louis, Mo., a corporation of Delaware
No Drawing. Filed Oct. 1, 1965, Ser. No. 492,279
7 Claims. (Cl. 23—106)

ABSTRACT OF THE DISCLOSURE

Dense granular sodium tripolyphosphate having at least about 75 weight percent of Form I sodium tripolyphosphate, having a bulk density between about 0.7 and about 1.3 grams per cc. and particles larger than the openings of a U.S. Standard 100 mesh screen and containing dispersed through said particles at least about 0.1 weight percent of stabilizing cations selected from the group consisting of potassium and alkaline earth metal cations.

---

The present invention relates to novel polyphosphate compositions and to processes for their manufacture. More particularly, the present invention relates to special physically stabilized and phase stabilized, relatively dense, granular sodium tripolyphosphates and to processes for their manufacture.

For a long period of time it was believed that the most useful crystalline form of anhydrous sodium tripolyphosphate (STP) was the so-called "low temperature" form, which is often also referred to as the "Phase II" (or "Form II") crystalline form or modification. Although "Phase II" STP hydrated in aqueous media (for example in detergent slurries) relatively slowly, its use made possible the avoidance of some relatively troublesome shortcomings that often resulted from the use of the so-called "high temperature" form ("Phase I" or "Form I") of STP. Perhaps the most important of these "shortcomings" relates to the troublesome formation of "gritty" or sand-like particles in the aqueous media upon the addition to the media of STP which contained a relatively large proportion (i.e., more than about 20 weight percent) of its STP in the "high temperature" (Phase I) crystalline form. However, with the development of improved processes for handling STP containing large proportions of Phase I material (such as those described in U.S. Patents 3,189,551, 3,133,024 and 3,174,934), STP containing large proportions of Phase I material has fairly recently become much more widely used.

Concurrently with this trend toward the use of more "Phase I" STP in the detergent, water-softening, and sequestering art, (as well as others), there has developed still another trend in STP usage; i.e., the use of granular STP materials having relatively higher particle densities. Therefore, a very desirable sodium tripolyphosphate product for contemporary large scale commercial consumption would be one which is (a) granular (having essentially all of its particles larger than 100 mesh, and preferably within the range of from about +100 mesh to about −10 mesh, as measured on a U.S. Standard Screen), and (b) relatively dense (having a bulk density of from about 0.7 to about 1.3 grams per cubic centimeter), and is at least about 75 weight percent (based on the total weight of the STP in the product) in the "Phase I" (high temperature) crystalline form. However, for some as yet unexplained reason, it has not been possible (prior to the present invention) to manufacture material having these desired characteristics, because when such manufacture is attempted, practically invariably, as soon as the dense, granular "high Phase I" material had been formed (generally by calcination at an elevated temperature) and cooled to about ambient temperature, it began to spontaneously disintegrate and within a relatively short time reverted into a light, powdery material that had lost not only its desired dense, granular physical form, but also a large proportion of its Phase I content. During the spontaneous physical disintegration of the granules of the dense, granular "high Phase I" STP material, the phase change (to less desirable Phase II materials) also took place. Neither of these changes was desirable in so far as a manufacturerer of STP was concerned. To make the problem still more difficult, the above-described spontaneous disintegration did not always occur, although usually it did occur. Illustrative of these difficulties are the comments made by G. W. Morey in an article entitled "The Transition Between the Low and the High-Temperature Form of Sodium Tripolyphosphate," appearing in the Feb. 20, 1958 issue of the Journal of the American Chemical Society, beginning at p. 775 and the remarks appearing at p. 461 in the Journal of the American Chemical Society, vol. 63, February, 1941, entitled "A Thermal, Microscopic and X-Ray Study of the System $NaPO_3=Na_4P_2O_7$," beginning on p. 454.

It is a primary object of the present invention to provide novel, stabilized dense granular "high Phase I" STP products that are not subject to the above-described spontaneous disintegration.

This and other objects, which will become apparent from the following description and claims, can be accomplished by blending into the raw material feed stream (in a process for manufacturing the dense granular "high Form I" sodium tripolyphosphate products which would otherwise be subject to the aforementioned spontaneous disintegration) a relatively small amount of either potassium (K) cations or alkaline earth metal cations (in the form of compounds or complexes containing such cations). Apparently these "stabilizing cations" (K or alkaline earth metal cations) of this invention must be fairly evenly distributed through the particles of STP product (rather than being merely on the surfaces of the particles) in order to effectively stabilize the dense granular STP material.

The "stabilizing cations" of the present invention can be incorporated into the "high Phase I" STP via any particular manner desired without detracting substantially from the benefits that can result from practicing the present invention so long as they are thereby distributed fairly uniformly through the particles of STP, and so long as the resulting STP product has the required relatively high bulk density (as set out above) and is granular in form (rather than powdered). One excellent way by which the introduction of "stabilizing cations" into the "high Phase I" STP products can be accomplished is by simply blending an appropriate amount of any material containing one or more of the "stabilizing cations" into the raw material feed stream (for the calciner in which the dense granular STP product is to be manufactured). Since, ordinarily, STP is manufactured by calcining a blend of monosodium orthophosphate, and disodium orthophosphate, the raw material "calciner" feed stream that is to be calcined in processes for the manufacture of the novel, stabilized dense granular "high Form I" STP products of this invention will generally consist essentially of a blend of these two orthophosphates, possibly some recycled STP, and one or more materials which serve as sources of one or more of the stabilizing cations. The Na/P ratio of this feed stream is generally between about 1.65 and about 1.70 and is preferably between about 1.66 and about 1.68.

Although any material which contains potassium magnesium, calcium, beryllium, strontium, barium and/or radium cations can be utilized as the source of the stabilizing cations in the preparation of the specially stabilized "high Form I" STP products of the present invention, it is preferred that water soluble salts of these materials be initially utilized. Typical, but non-limiting, examples of water soluble salts (containing "stabilizing cations") useful in this preferred process include, but are not limited to potassium acetate, potassium aluminate, potassium aluminum borate, potassium sulfate, potassium amide, potassium ammonium tartrate, potassium dihydrogen pyroantimate, potassium antimony tartrate, potassium azide, potassium benzoate, potassium metaborate, potassium tetraborate, potassium boro-tartrate, potassium bromate, potassium bromide, potassium cadmium iodide, potassium calcium chloride, potassium calcium magnesium sulfate, potassium d-camphroate, potassium carbonate, potassium bicarbonate, potassium peroxycarbonate, potassium chloride, potassium chromate, potassium dichromate, potassium chromium sulfate, potassium citrate, potassium cobalt sulfate, potassium fluoride, potassium fluostannate, potassium glycerophosphate, potassium hydroxide, potassium iodate, potassium iodide, potassium ferric oxalate, potassium sulfate, potassium magnesium chloride, potassium permanganate, potassium molybdate, potassium nickel sulfate, potassium nitrate, potassium nitrite, potassium nitrophenoxide, potassium oleate, potassium oxalate, potassium phthalate, potassium propionate, potassium salicylate, potassium silicate, potassium sodium carbonate, potassium sulfide, potassium thiosulfate, $Be(C_6H_5O_3S)_2$, $BeBr_2$, $BeCl_2$, $BeF_2$, $Be(NO_3)_2 \cdot 3H_2O$, $BeC_2O_4 \cdot 3H_2O$, beryllium orthophosphate, beryllium sulfate, BeS, $Mg(C_2H_3O_2)_2$, magnesium benzoate, $$Mg_3(BO_3)_2, Mg(BrO_3)_2 \cdot 6H_2O, MgBr_2$$

magnesium chlorate, $MgCl_2$, $MgCrO_4$, $MgSiF_6$, magnesium formate, magnesium iodate, $MgI_2$, magnesium lactate, $Mg(NO_3)_2$, magnesium hypophosphite, $MgSO_4$, $MgSO_3$, magnesium thiosulfate, calcium acetate, calcium benzoate, calcium bromate, calcium bromide, calcium hydroxide, calcium carbide, calcium chlorate, calcium chloride, calcium iodide, calcium lactate, calcium nitrate, calcium oxide, calcium thiocarbonate, calcium dithionate, calcium thiosulfate, calcium valerate, strontium acetate, strontium bromide, strontium chlorate, $SrCl_2$, $SrSiF_6$, $SrI_2$, strontium lactate, $Sr(NO_3)_2$, strontium salicylate, $SrS_2O_3$, barium acetate, $BaBr_2$, $BaI_2$, barium butyrate, barium chlorate, $BaCl_2$, barium formate, $Ba(OH)_2$, barium permanganate, $Ba(NO_3)_2$, $Ba(NO_2)_2$, $BaC_2O_4$, barium hypophosphite, $BaS_2O_8 \cdot 4H_2O$, barium sulfide, $RaBr_2$, $RaCl_2$, and the like. Although they can be used advantageously in the practice of this invention, generally because of cost and other important considerations, it is preferred to use materials other than barium, radium, strontium, and beryllium compounds as the source of "stabilizing cations" in the practice of this invention.

Since potassium, calcium and magnesium cations are preferred "stabilizing cations" for the practice of the present invention (with potassium cations still further preferred), the use of water soluble inorganic salts containing these cations in the raw material calciner feed stream represents a preferred embodiment of the processes of this invention. The reason that the particular material (containing one or more of the "stabilizing cations" described above) that is utilized in processes for the preparation of the stabilized STP compositions of the present invention should preferably be fairly water-soluble is that, for most commercial uses of STP, substantially completely water soluble STP is generally desired. Thus, the particular type of K+ and/or alkaline earth metal cation-bearing materials that are initially intermixed with the STP is not critical. The only requirement is that the resulting stabilized, dense, granular "high Phase I" STP product (containing the small amount of "stabilizing cation") is substantially completely wither-soluble. Evidently (with only one known exception), the identity and chemical character of the anion to which these "stabilizing cations" are attached initially (before they are introduced into the "high Form I" STP products) has no import in so far as the successful practice of the present invention is concerned. The "exception" just referred to relates to the use of sulfates, in which case the sulfate anion is also effective in stabilizing the "high Form I" STP products which can be stabilized in accordance with the present invention. Details relating to the use of sulfate anions to stabilize these materials can be found in U.S. patent application Ser. No. 492,327 filed concurrently herewith.

Although the presence of even extremely small amounts of one or more of the aforesaid water soluble salts (containing potassium and/or alkaline earth metal cations) in the dense, granular "high Phase I" STP products that are otherwise ordinarily subject to the spontaneous disintegration described above (and that are therefore useful subjects upon which to practice the present invention) has at least some beneficial stabilizing effect, generally in order to yield sufficient stabilizing benefits for such benefits to be readily noticeable as the result of ordinary (non-instrumental) observation of the "stabilized" material, there should be at least about 0.1 weight percent of K, Ca, Mg, Rb, Cs or Fr cations incorporated fairly uniformly through the stabilized dense, granular "high Phase I" STP. Although for practically complete stabilization, apparently relatively higher levels of such "stabilizing cations" must be present in the relatively more dense STP products of the present invention (that also contain relatively higher levels of the Phase I STP crystalline modification; i.e., those containing >90% Phase I STP), generally practically complete stabilization can be obtained by incorporating enough of one or more of the above-described water soluble compounds (containing one or more of the aforesaid "stabilizing cations") into the material to be stabilized to yield at least about 0.2 weight percent of the "stabilizing cations" in the resulting stabilized product. When it is desired to practically completely stabilize extremely pure "high Phase I" STP products (containing 95 weight percent or more of Phase I material) that are also very dense (having bulk densities between about 1.0 and about 1.3)— which STP products are extremely difficult to stabilize— generally at least about 0.25 weight percent of the "stabilizing cations" must be present in the effectively stabilized very dense, granular, "very high Phase I" STP products. No critical upper limit regarding the amount of "stabilizing cations" is known, although from the following description of the STP products that can be treated in accordance with the processes of this invention it will become apparent that at most about 25 weight percent of materials other than STP should be present in the stabilized products resulting therefrom. However, generally no additional advantages can be obtained by using more than about 3 weight percent of "stabilizing cations" to accomplish the desired degree of physical and phase stabilization of dense, granular "high Phase I" STP in the practice of the present invention.

The sodium tripolyphosphate products that can be treated most successfully in the practice of the present invention are those having a "T.R." of about 25 or more. "T.R." is a trade-recognized term meaning "Temperature Rise," which in turn is an indication of the amount of Phase I material in the particular sodium tripolyphosphate product being referred to in terms of T.R. The determination of T.R. is accomplished in standard test involving the measurement of the amount of heat evolved by a particular sample of sodium tripolyphosphate when it becomes hydrated to the hexahydrate while suspended in wet glycerine. Glycerine inhibits the hydration of "Phase II" STP but does not inhibit the hydration of Phase I STP. Thus, it can readily be appreciated that the total amount of heat evolved from a given sample of sodium tripolyphosphate, when the sample is subjected to this standard "T.R." test, serves as an excellent indication of the total amount of Phase I STP in the sample. The determination of the amount of Phase I material by the "T.R." test is fairly accurate, the results from the "T.R." test having been confirmed by X-ray diffraction techniques. A detailed discussion of the "T.R." test can be found in an ASTM Bulletin, July 1953, pp. 45–48 (by J. D. McGilvery). Of those STP products having T.R.'s of 25 or more, those having relatively higher T.R.'s are somewhat more difficult to stabilize (to prevent the spontaneous degradation described above. Therefore application of the processes of the present invention to STP products having T.R.'s of 27 or more represent preferred embodiments of this invention. In terms of the "assay" of these STP products, those that can be successfully stabilized in accordance with the present processes must contain at least about 85 weight percent of sodium tripolyphosphate. Of this, at least about 70 weight percent should be Phase I material.

Minor amounts of other materials can be present in these STP products. However, generally at least about 95 weight percent of the products that are treated via the processes of this invention should be polyphosphatic in nature and should be (in addition to at least about 85 weight percent of STP) either pyrophosphate, "glassy" (chain) metaphosphates or trimetaphosphates or mixtures thereof. These STP products are typical, relatively dense, granular materials that can be manufactured by any particular conventional calcination or fusion process desired, since apparently the particular process by which they are manufactured does not greatly influence the beneficial results that can be obtained by practicing the present processes. The ratio of Na/P in such products, however, should generally be from about 1.65 to about 1.70. The greatest benefits from practicing the present invention, however, are obtainable when the Na/P ratio of the hot STP product is within the range of from about 1.66 to about 1.68.

In the following examples, which represent some of the preferred embodiments of the present invention, all parts are by weight unless otherwise specified.

EXAMPLE I

An aqueous solution containing 294 parts of monosodium orthophosphate, 696 parts of disodium orthophosphate, and 20 parts of potassium chloride is dried on a conventional steam heated, stainless steel drum dryer. The resulting damp flakes are then introduced into one end of a conventional direct-fired countercurrent rotary calciner. Just after the feed is introduced into the calciner, it is intermixed with 15 weight percent of water, the water being sprayed onto the powdered material (as it revolved in the calciner) over a period of about one minute. The temperature of the resulting mixture is then raised over a period of about 20 minutes to about 550° C. at which point almost 90 weight percent of the mixture is Phase I STP. The temperature of the reaction mixture is maintained at about 550° C. for an additional 30 minutes after which it is found to contain 96 weight percent of Phase I STP. This material is then removed from the calciner and screened. The granular fraction of the product (100 weight percent of +100 mesh material) represents the desired dense granular "high Phase I" STP product. The T.R. of this granular fraction is about 30.

The dense granular product is analyzed and found to have bulk density of about 0.9 gram per cc. It is physically stabilized and phase stabilized to the extent that it does not spontaneously disintegrate significantly under ordinary conditions of storing and handling over a period of many months. By comparison, a "high Phase I" STP product that is manufactured in a practically identical manner, except that no potassium chloride was added to the raw material feed stream, spontaneously reverted to mostly Phase II material and physically distintegrated to a powder by the time it is cooled to ambient temperatures. For example, instead of retaining the desired characteristics (as exemplified by the dense granular material containing one weight percent of potassium cations) this conventionally manufactured material has the following characteristics after its spontaneous disintegration:

| | |
|---|---|
| Total STP content _____percent__ | 96 |
| Total "Phase I" STP _____do___ | 49 |
| Tetrasodium pyrophosphate _____do___ | 3 |
| Sodium trimetaphosphate _____do___ | 0.2 |
| Temperatures rise (T.R.) _____ | 18 |
| Particle size distribution (−100 mesh) ___percent__ | 95 |

EXAMPLE II

In a process such as that detailed in Example I above, a dense granular "high Phase I" STP product is manufactured by calcining a blend containing 30 weight percent of monosodium orthophosphate, 68 weight percent of disodium orthophosphate, 2 weight percent of tetrasodium pyrophosphate (to prevent the formation of cloudiness in the initial water solution), and 1.5 weight percent of $Ca(Br)_2$. In addition to being successfully physically stabilized and phase stabilized, the resulting dense granular product had the following characteristics:

| | |
|---|---|
| Total STP content _____percent__ | 96 |
| Total "Phase I" STP _____do___ | 95 |
| Tetrasodium pyrophosphate _____do___ | 3 |
| Sodium trimetaphosphate _____do___ | 0.2 |
| Bulk density _____grams/cc__ | 1.0 |
| Temperature rise (T.R.) _____ | 30 |
| Particle size distribution: | |
| +20 mesh _____percent by weight__ | 8 |
| −20 +40 mesh _____do___ | 40 |
| −40 +60 mesh _____do___ | 40 |
| −60 +100 mesh _____do___ | 12 |

EXAMPLE III

In a process such as that detailed in Example I above, a dense granular "high Phase I" STP product is manufactured by calcining a blend containing 30 weight percent of monosodium orthophosphate, 70 weight percent of disodium orthophosphate, 3 weight percent of recycled sodium tripolyphosphate, and 2 weight percent of magnesium carbonate. In addition to being successfully physically stabilized and phase stabilized, the resulting dense granular product had the following characteristics:

| | |
|---|---|
| Total STP content _____percent__ | 93 |
| Total "Phase I" STP _____do____ | 90 |
| Tetrasodium pyrophosphate _____do____ | 6 |
| Sodium trimetaphosphate _____do____ | 0.2 |
| Bulk density _____grams/cc__ | 0.9 |
| Temperature Rise (T.R.) _____ | 28.5 |
| Particle size distribution (+100 mesh) __percent__ | 100 |
| +20 mesh _____percent by weight__ | 8 |
| −20 +40 mesh _____do____ | 40 |
| −40 +60 mesh _____do____ | 40 |
| −60 +100 mesh _____do____ | 12 |

EXAMPLE IV

A very dense STP product is prepared initially by melting together at 900° C. a mixture of 2.00 lb moles of disodium orthophosphate, 1.00 lb. mole of monosodium orthophosphate, and 0.8 lb. of $KNO_3$ and subsequently quickly chilling the resulting "melt." The chilled "melt" product is then passed through a conventional coarse mill and screened. That fraction which is retained on a 100 mesh screen is then reheated to 550° C. and held at about this temperature for 4 hours. The resulting very dense "high Phase I" STP product has the following characteristics:

| | |
|---|---|
| Temperature Rise (T.R.) _____ | 30.4 |
| Total STP content _____percent__ | 98 |
| Total "Phase I" STP _____do____ | 97 |
| Tetrasodium pyrophosphate _____do____ | 1.3 |
| Sodium trimetaphosphate _____do____ | 0.7 |
| Bulk density _____grams/cc__ | 1.3 |
| Particle size (−20 +100 mesh) _____percent__ | 100 |

This hot very dense granular STP product is then cooled gradually (over a period of 40 minutes) in a conventional STP cooler to about 30° C. Then the product is removed from the cooler and stored for observation. Under ambient conditions (in a conventional STP storage silo) the resulting granular "high Phase I" STP product retained its excellent physical and chemical stability over the entire storage test period of more than a month. In an otherwise similar procedure in which a very dense granular "high Phase I" STP product is prepared (but in which the KNO$_3$ is absent from the initial "melt") 65% of the original Phase I STP reverts to Phase II materials by the time the temperature of the "granular" product is finally cooled to below 30° C. The T.R. of this is only 14. In addition the granules of this product spontaneously disintegrate during this conventional cooling step, so that by the time the temperature of the originally granular STP product reaches about 30° C., 85 weight percent of it is powdered (−100 mesh) material.

While in the aforesaid examples, the use of only certain specific materials containing certain of the above-described "stabilizing cations" of this invention is illustrated, it should be kept in mind that any of the "stabilizing cations" of the present invention can be utilized advantageously in a similar manner.

What is claimed is:

1. Dense, granular sodium tripolyphosphate having a Form I sodium tripolyphosphate content of at least about 75 weight percent, a bulk density between about 0.7 and about 1.3, particles too large to pass through a U.S. Standard 100 mesh screen and containing dispersed through said particles at least about 0.1 weight percent of stabilizing cations selected from the group consisting of potassium and alkaline earth metal cations.

2. Dense, granular sodium tripolyphosphate having a Form I sodium tripolyphosphate content of at least about 84 weight percent and a bulk density between about 0.7 and about 1.3; particles of said dense granular sodium tripolyphosphate being substantially all too large to pass through a U.S. Standard 100 mesh screen and too small to be contained on a U.S. Standard 10 mesh screen, and said particles containing evenly distributed therethrough at least about 0.2 weight percent of cations selected from the group consisting of potassium, calcium and magnesium.

3. Dense, granular sodium tripolyphosphate having a Form I sodium tripolyphosphate content of at least about 90 weight percent and a bulk density between about 1.0 and about 1.3; the particles of said dense granular sodium tripolyphosphate being too large to pass through a U.S. Standard 100 mesh screen and too small to pass through a U.S. Standard 10 mesh screen, and containing, dispersed therethrough, between about 0.2 and about 5 weight percent of potassium cations.

4. Dense, granular sodium tripolyptosphate, as in claim 3, wherein said Form I sodium tripolyphosphate content is at least about 94 weight percent, and the amount of said potassium cations contained dispersed through said particles of sodium tripolyphosphate is between about 0.25 and about 5 weight percent.

5. Dense, granular sodium tripolyphosphate having a T.A. of at least about 28.5 and a bulk density between about 1.0 and about 1.3; the particles of said dense granular sodium tripolyphosphate being too large to pass through a U.S. Standard 100 mesh screen and too small to pass through a U.S. Standard 10 mesh screen, and containing, dispersed therethrough, between about 0.2 and about 5 weight percent of magnesium cations.

6. A process for preparing a stabilized, dense, granular sodium tripolyphosphate containing at least about 75 weight percent of Form I sodium tripolyphosphate comprising adding at least about 0.1 weight percent of a stabilizing cation selected from the group consisting of potassium and alkaline earth metal cations to a blend of monosodium orthophosphate and disodium orthophosphate and thereafter calcining said blend at a temperature sufficient to produce said stabilized, dense, granular sodium tripolyphosphate product containing at least about 75 weight percent of Form I sodium tripolyphosphate.

7. A process according to claim 6 wherein said stabilizing cation is potassium.

References Cited

UNITED STATES PATENTS

| | | | |
|---|---|---|---|
| 2,396,918 | 3/1946 | Hubbard et al. | 23—106 |
| 3,338,671 | 8/1967 | Marshall et al. | 23—106 |

OSCAR R. VERTIZ, *Primary Examiner.*

L. A. MARSH, *Assistant Examiner.*